United States Patent [19]

Balsells

[11] Patent Number: 5,161,806
[45] Date of Patent: Nov. 10, 1992

[54] SPRING-LOADED, HOLLOW, ELLIPTICAL RING SEAL

[75] Inventor: Peter J. Balsells, P.O. Box 15092, Santa Ana, Calif. 92705

[73] Assignees: Peter J. Balsells; Joan C. Balsells, Santa Ana, Calif.

[21] Appl. No.: 834,941

[22] Filed: Feb. 12, 1992

Related U.S. Application Data

[63] Continuation of Ser. No. 628,370, Dec. 17, 1990.

[51] Int. Cl.$^5$ .............................................. F16J 15/12
[52] U.S. Cl. ................................... 277/163; 277/164; 267/1.5
[58] Field of Search ................... 277/163, 164, 235 R; 267/1.5

[56] References Cited

U.S. PATENT DOCUMENTS 3,820,799  6/1974  Abbes et al. ......................... 277/164

FOREIGN PATENT DOCUMENTS 0355611  2/1990  European Pat. Off. .
0450392  9/1991  European Pat. Off. .
1075909  2/1960  Fed. Rep. of Germany .
0475967  11/1937  United Kingdom .

*Primary Examiner*—William A. Cuchlinski, Jr.
*Assistant Examiner*—Daniel G. DePumpo
*Attorney, Agent, or Firm*—Walter A. Hackler

[57] ABSTRACT

A canted-coil spring-loaded ring seal assembly including a plurality of coils having a major and a minor axis and canted along a center line defined by an intersection of the major and minor axes along with an elastic material, disposed around and between said plurality of coils and having a hollow cross-section, for modifying the force exerted by the spring assembly in response to deflection of the spring assembly along said loading direction and for providing a sealing surface. The plurality of coils and elastic material are noninvasively supported in an orientation for controlling the resilient characteristics of the plurality of coils and for orienting said sealing surface for sealing contact with a loading member.

18 Claims, 10 Drawing Sheets

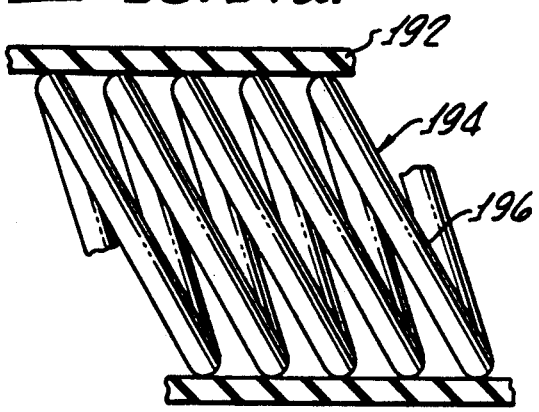
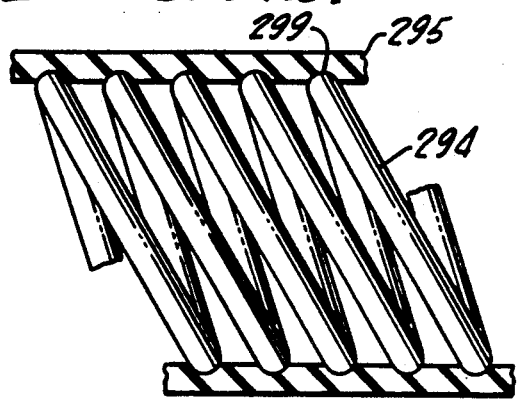
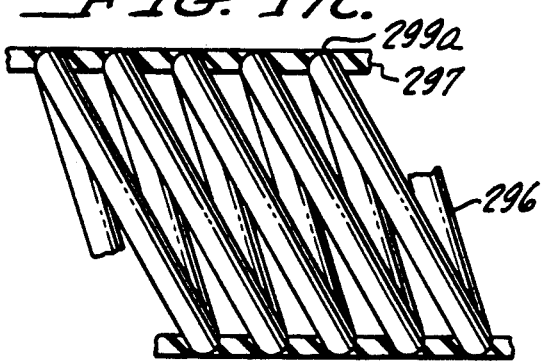
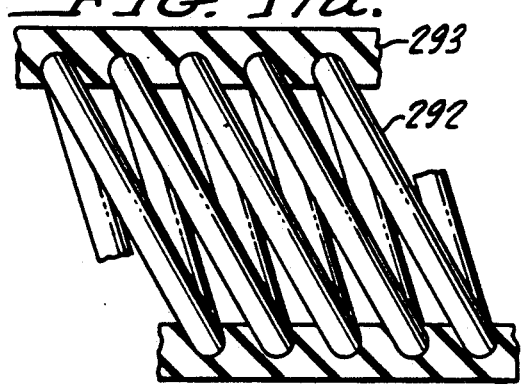
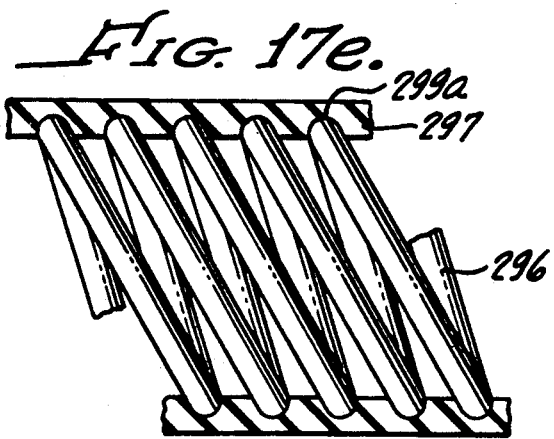

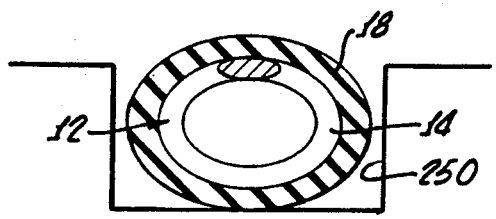
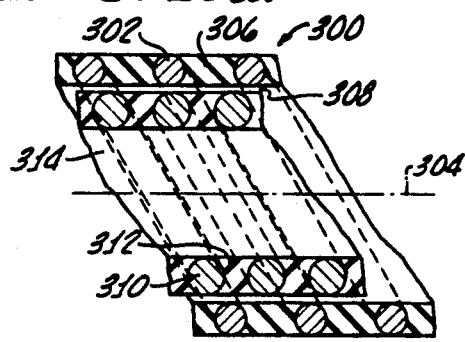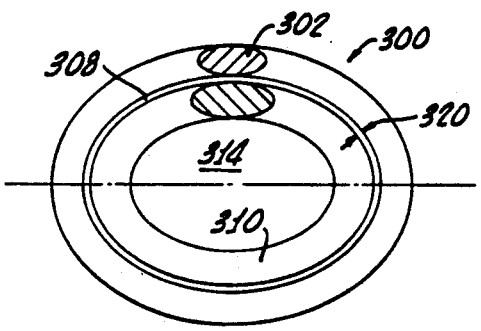
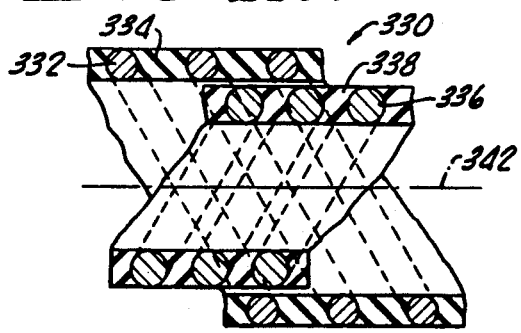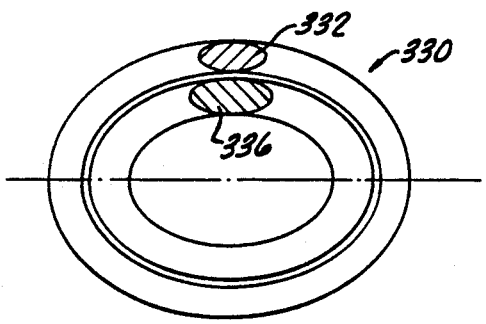
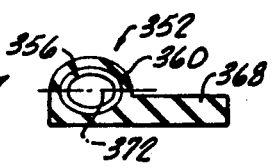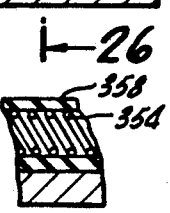

SPRING-LOADED, HOLLOW, ELLIPTICAL RING SEAL

This application is a continuation of application Ser. No. 628,370, filed Dec. 17, 1990.

The present invention is generally directed to an assembly for the sealing of gases and liquids and more particularly is directed to a seal assembly that can be mounted on pistons or housings and the like for use in both static and dynamic applications, the latter including reciprocating, rotating and oscillatory movement.

Heretofore, common O-ring seals have been utilized in static and dynamic applications. However, such O-rings, usually made from homogeneous elastic material such as rubber or the like, have a serious disadvantage in that they tend to set during aging, such aging process generally being accelerated at elevated temperatures.

In a typical application, the O-ring is compressed approximately 30% of its total height, causing deformation of the O-ring in a manner producing flat areas thereon. After a period of time, the O-ring sets, with the degree of setting due to aging, varying with the material of construction and also the fluid to which the O-ring is exposed.

In accordance with Hook's law, upon loading the O-rings, a force is created which is proportional to the deflection thereof. That is, the greater the deflection, the greater force exerted by the O-ring. This characteristic leads to poor wear characteristics of the O-ring. In addition, O-rings generally have a higher coefficient of expansion than a metallic piston or housing, sealed by the O-ring. Upon setting of the seal, the O-ring expands more than the metal, thus creating a greater force and concomitant deformation of the O-ring. Thereafter, at a lower temperature, the O-ring becomes loose on the outside diameter thereof, which may cause leakage. Of course, the degree of leakage and setting of the O-ring depends upon the thermocycling and the temperature at which such thermocycling occurs, along with the specific composition of the O-ring and its cross-section among other factors.

In rotary applications, the O-rings have yet additional disadvantages. It is well known that when an O-ring is mounted on a housing with a shaft passing through the inside diameter thereof and the shaft rotated, a certain degree of friction occurs between the shaft and the surface of the O-ring on its inside diameter. The higher the RPM of the shaft, the greater the pressure applied to the O-ring, which results in a greater degree of friction developed between the shaft and the inside diameter of the ring. This effect, known as the Gow-Joule effect, causes the O-ring to shrink, rather than expand, towards the shaft, and the higher the temperature developed, the greater the shrinkage that occurs toward the shaft. This causes greater wear of the O-ring.

A specific disadvantage of conventional O-ring utilized in reciprocating applications in which the O-ring is mounted on a piston or a shaft relates to torsional effects on the O-ring. That is, when O-rings are mounted in a rectangular-type O-ring groove on a shaft or piston, some axial movement occurs which results in a tendency of the O-ring to roll, depending upon the reciprocating speed or pressure across the O-ring. Naturally, in high speed applications at high pressure, this effect is considerable and may eventually result in O-ring failure due to the rolling and/or torsional effects on the ring.

The present invention is directed to a spring-loaded O-ring seal assembly, including a canted-coil spring, which is filled with an elastomer having a hollow cross-section. Heretofore, there has been no attempt to utilize an elastic or plastic in order to modify the force exerted by the spring assembly in response to the deflection of the spring along a loading direction. Prior use of a plastic material in combination with a canted-coil spring has been limited to the use of a canted-coil spring imbedded in an elastic material to provide a reinforcement thereof, totalling sacrificing any load-deflection characteristics of the spring, see U.S. Pat. No. 3,183,010 to Bram.

SUMMARY OF THE INVENTION

A spring-loaded ring seal assembly in accordance with the present invention generally includes a plurality of coils having a major and a minor axis and canted along a center line defined by an intersection of the major and minor axes. An elastic material is disposed around and between the plurality of the coils for modifying the force exerted by the spring assembly in response to a deflection of the spring assembly along the loading direction, the elastic material having a hollow cross-section. The elastic material also provides a sealing surface. By including a hollow cross-section, the elastic material permits a greater degree of deflection and enables the spring force to remain relatively constant. Thus, the total amount of force on the elastic material is reduced which results in significantly lower friction, wear, and setting of the elastomer material.

In addition, means are provided for noninvasively supporting the plurality of coils and the elastic material in an orientation for controlling the resilient characteristics of the plurality of coils and further for orienting the sealing surface for sealing contact with a loading member. More specifically, the canted-coil spring assembly, in accordance with the present invention, includes coils interconnected in a manner forming a garter-type resilient canted-coil spring and the means for noninvasively supporting the garter-type resilient coil springs includes a means for defining a cavity for deflecting the coil spring along a minor axis thereof and enabling the garter-type resilient coil spring to be loaded along a major axis thereof. Further, the garter-type resilient coil spring may be oriented with a turn angle greater than 0° and less than 90°.

In one embodiment of the present invention, the plurality of coils disposed within the elastic material in a stretched spaced-apart relationship with the elastic material having sufficient resistance to hold the plurality of coils in the stretched spaced-apart relationship, the spacing between the coils in the stretched spaced-apart relationship being greater than the spacing between coils when not held in the stretched apart relationship by the elastic material.

In another embodiment of the present invention, the plurality of coils are disposed within the elastic material in a preloaded condition in which the plurality of coils are deflected along the loading direction.

BRIEF DESCRIPTION OF THE DRAWINGS

A better understanding of the present invention may be had from the consideration of the following detailed description, taken in conjunction with the accompanying drawings in which:

FIGS. 17a–e show views of the spring with varying positions and amounts of elastic material in combination therewith.

FIG. 22 is an alternative embodiment of the present invention showing a plurality of coils with an elastic material thereabout;

FIGS. 23a and b are views of an alternative embodiment of the present invention with a first and second plurality of coil means being canted in the same direction along the common center line and separated from one another;

FIGS. 24a and b show an alternative embodiment of the present invention in which the first and second plurality of coil means being canted in opposite directions, and the elastic material has a substantially greater dimension than the diameter of the plurality of coils which provides a means for positioning the plurality of coils in order that the loading direction is approximately perpendicular to the center line tangent;

FIG. 25 is a sectional view of an alternative embodiment of the present invention showing the mounting of the spring assembly utilizing portions of an elastic member to position the coils;

FIG. 26 is a cross-section view of FIG. 25 taken along the line 26—26;

FIG. 27 is an alternative embodiment of the present invention showing an alternate shape of the elastic member;

DETAILED DESCRIPTION

Figure 1A:
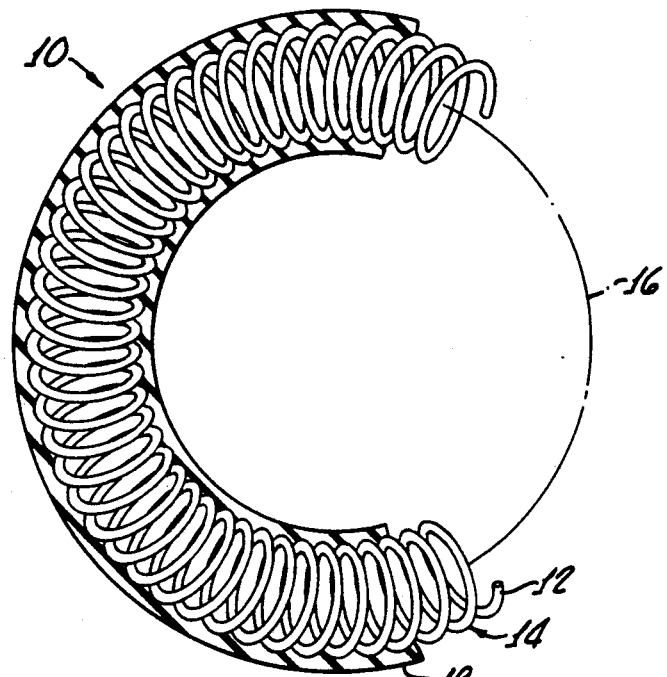
FIG. 1a is a partially cut-away perspective view of the spring assembly in accordance with the present invention generally showing a plurality of coil means disposed within an elastic material having a hollow center.
Figure 1B:
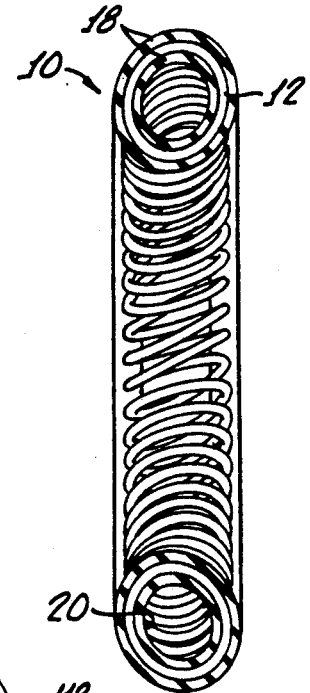
FIG. 1b is a front cross-sectional view of the spring shown in FIG. 1a taken along the line 1b—1b.

Turning now to FIGS. 1a and 1b, there is generally shown a spring assembly 10, in accordance with the present invention, which includes a plurality of coils 12 interconnected with one another in a spaced-apart relationship for causing the spring assembly 14 to exert a generally constant force in a loading direction, normal to a tangent to a center line 16, as will be hereinafter described in greater detail. An elastic material 18 which is disposed around and between the plurality of coils 12 includes a hollow cross-section 20 which provides means for modifying the force exerted by the spring assembly 14 in response to deflection of the spring assembly 10 along a loading direction as hereinafter described in greater detail.

FIGS. 2 through 7 show a number of canted-coil assemblies 30, 32, 34, 36, suitable for use in the present invention, each including a plurality of coils 38, 40, 42, 44. The springs 30 and 32 have the coils 38, 40 interconnected in a manner forming a circular spring having a primary load-deflection characteristic along an axial direction of the circular spring 30, 32. Spring 30 shown in FIGS. 2 and 3 has a clockwise canting coil, with the coils 38 interconnected so that a back angle 48, which defines a tailing portion 50, is along an inside diameter 52 of the spring 30 and a front angle 56, which defines a leading portion 58 of the coil 30, is along an outside diameter 60 of the spring 30.

Figure 5:
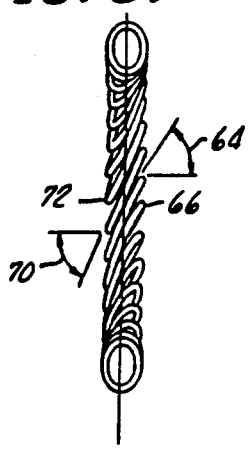
FIG. 5 is a view showing the spring in FIG. 4 taken along the line 5—5 illustrating a back angle on an outside diameter of the spring and a front angle on an inside diameter of the spring.
Figure 4:
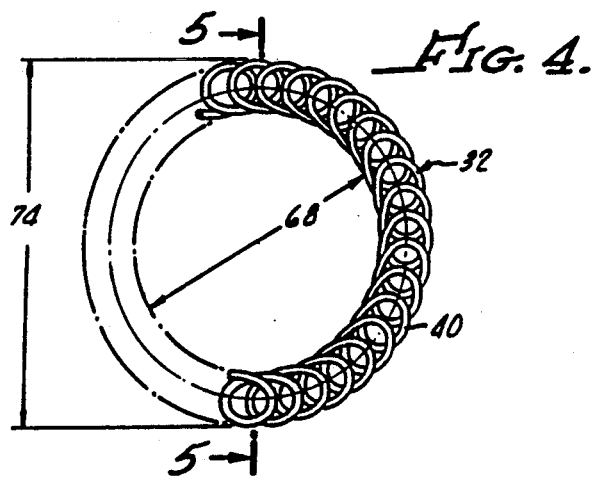
FIG. 4 is a spring in accordance with the present invention in which the coils are canted in a counter-clockwise manner.

Turning to FIGS. 4 and 5, the axial spring 32 therein has coils 40 interconnected in a manner having a counterclockwise canted-coil with a back angle 64 defining a trailing portion 66 along an inside diameter 68 of the spring 32 and a front angle 70, defining a leading portion 72 along an outside diameter 74 of the spring 32.

Figure 7A:
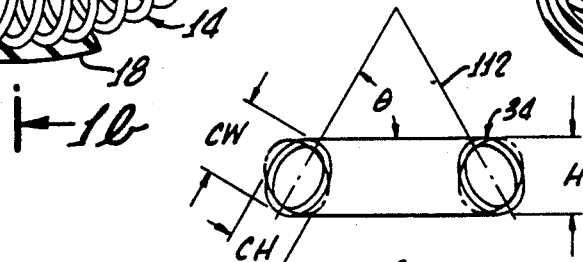
FIGS. 7 and 7a are a canted-coil radial spring in accordance with the present invention in which the coils are canted in a counterclockwise direction of the back angle disposed in the bottom thereof.
Figure 6:
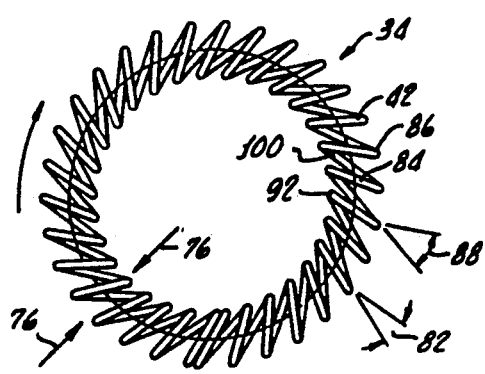
FIG. 6 is a plane view of a radial spring in accordance with the present invention which is canted in a clockwise direction along the center line thereof, with the back angle on the top.
Figure 7:
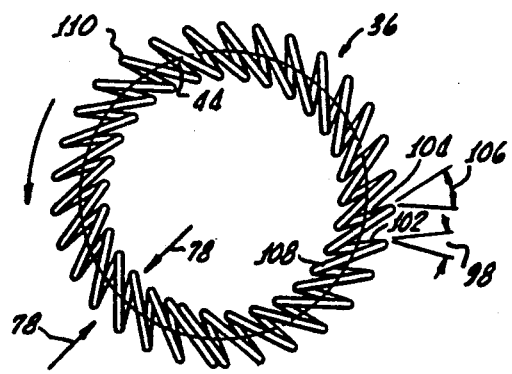

Turning now to FIGS. 6 and 7, there are shown springs 34, 36 having a plurality of coils 42, 44 which are interconnected in a manner forming a circular spring having a primary load-deflection characteristic along a radial direction indicated by the arrows 76, 78, respectively. As shown in FIG. 6, the coils are interconnected in a manner for providing a clockwise canting with a back angle 82 defining a trailing portion 84 along a top 86 and a front angle 88 defining a leading portion 92 disposed along the bottom 100 of the spring 34.

Alternatively, as shown in FIG. 7, spring 36 may have coils 44 connected in a manner causing a canting of the coils in a counterclockwise direction with a back angle 98 defining a trailing portion 104 along a bottom 102 of the spring 36 and a front angle 106 defining a leading portion 108 along a top 110 of the spring 36.

As hereinafter described, all of the springs 30, 32, 34, 36 may have a generally constant force deflection characteristic within a working deflection thereof.

Yet another structural arrangement of the canted-coil assemblies 30, 32, 34 and 36 is their orientation within the elastomer 18. As described in U.S. Pat. No. 4,893,795 issued Jan. 16, 1990, to Balsells, entitled "Radially Loaded Canted-Coil Springs with Turn Angle" the spring assembly may be held in a turn angle orientation by the elastomer.

FIG. 7a shows in schematic form a cross-section of the canted-coil spring 34, in accordance with the present invention, with a turn angle $\theta$, a measured coil width of CW, a measured coil height of CH, and a measured spring height H of the spring 34. As shown in FIG. 7a, the turn may be clockwise (bold lines) or counterclockwise (dashed lines). The turn angle $\theta$ may be defined as an angle formed by a generally circular spring forming a cone or inverted cone, depending on the position of the spring, and measuring the turn angle for the horizontal to the intersection through the center line 112 of the spring 34.

Figure 8:
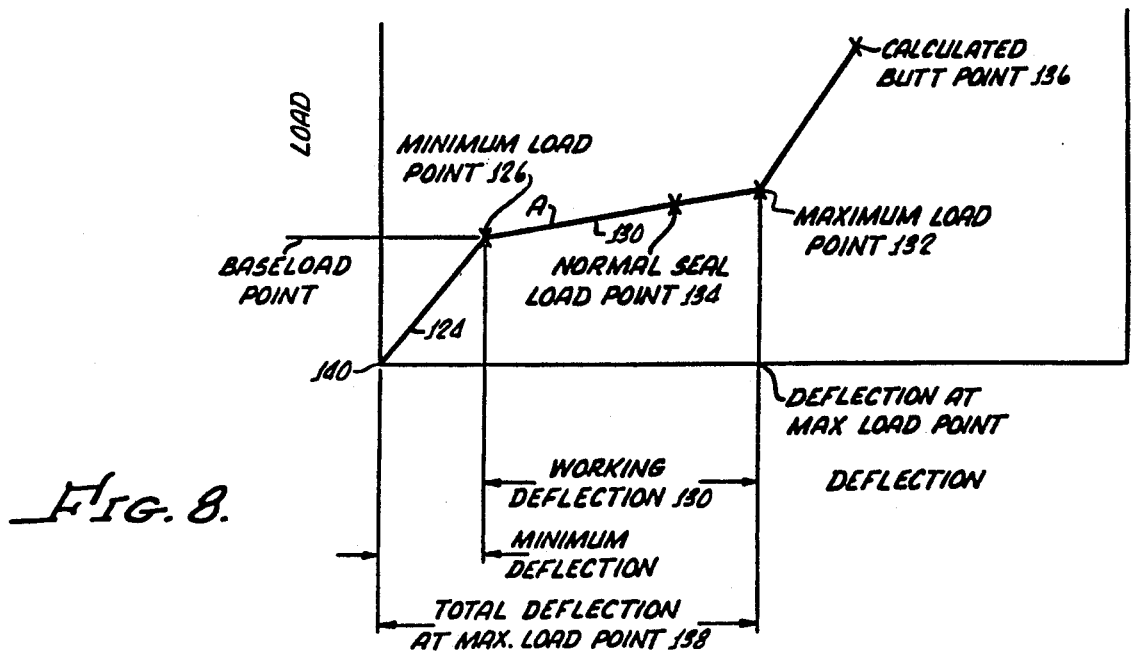
FIG. 8 shows a typical load-deflection curve for a spring assembly in accordance with the present invention for the purpose of defining the nomenclature thereof.
Figure 3:
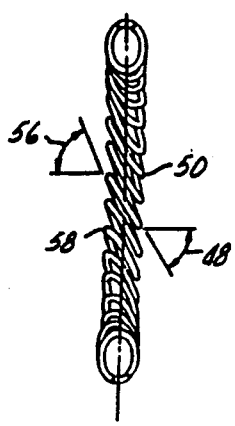
FIG. 3 is a view taken along the line 3—3 of the spring shown in FIG. 2 illustrating a back angle on an inside diameter of the spring and a front angle on an outside diameter of the spring.
Figure 2:
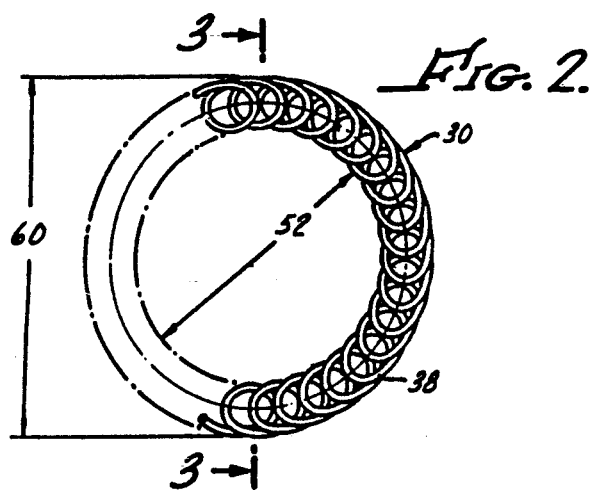
FIG. 2 is an axial canted-coil spring in accordance with the present invention with the coils being canted in a clockwise direction.

FIG. 8 shows a representative load-deflection curve A for springs 30, 32, 34, 36 in which the spring exhibits a generally linear load-deflection relationship as shown by the line segment 124, until it reaches a minimum load point 126, after which the load-deflection curve remains relatively constant within a working deflection 130 between the minimum load point 126 and a maximum load point 132. Between the minimum load point 126 and the maximum load point 132, the load-deflection curve may be constant or show a slight increase as shown in FIG. 8.

The area between the minimum load point 126 and the maximum load point 132 is commonly referred to as the working range 130 of the spring. The spring 30, 32, 34, 36 is normally loaded for operation within this range as indicated by the point 134.

Loading of the spring 30, 32, 34, 36 beyond the maximum load point 132 results in an abrupt deflection response until it reaches a butt point 136, which results in a permanent set of the spring as a result of overloading. Also indicated in FIG. 8 is a total deflection range of 138 representing the deflection between a zero point 140 and the maximum load point 132.

The elastomer, or elastic material, 18 (see FIG. 1), suitable for the present invention, may be any synthetic or natural material capable of recovering its original size and shape after deformation, i.e., the material is resilient.

Figure 9:
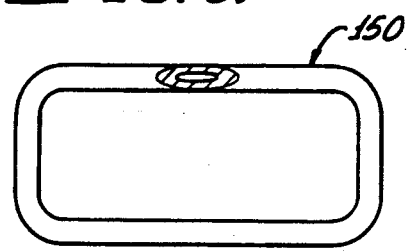
FIG. 9 shows an axial spring with an irregular shape in accordance with the present invention having a hollow interior.

While the spring assembly 10 shown in FIG. 1 has a generally circular shape, it should be appreciated that any irregular shape such as the spring assembly 150 shown in FIG. 9 as long as the cross-section thereof is hollow in cross-section. Alternatively, the spring 12 may not be joined, for example, as shown in FIG. 1. In this instance, the length of elastomer coated, or filled, coils may be used in applications suitable for linear springs.

The spring 14 may be filled by any manufacturing method suitable for the elastomer employed, such methods including extrusion, molding, spraying or any other suitable method for introducing elastomer 18 in and around the coils 12 of the spring 14, while leaving a hollow cross-section 20 along the center line 16. Such other methods may include the fusing of two tubular parts (not shown), one disposed on the inside of the spring 14 and one disposed on the outside of the spring 14 with the fusing of the parts filling of the spaces between the coils 12.

Alternatively, the elastomer 18 may be formed in and around the coils 12 while a rod 151 of fugitive compound 150 is disposed within the coils 12. (See FIG. 1a.) Thereafter the fugitive compound is dissipated or removed by heat or solution, as is well known in the art.

Figure 10:
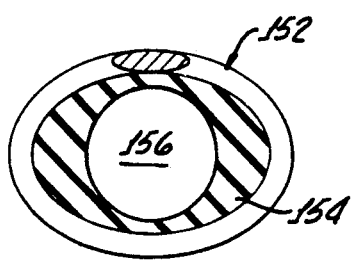
Figure 11:
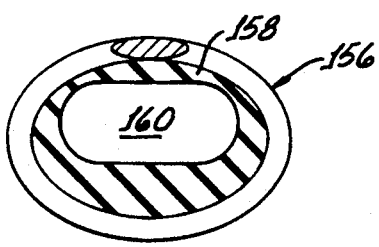
Figure 12:
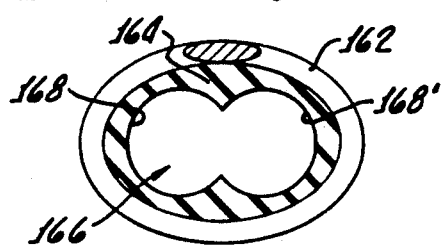

Various embodiments of the present invention are shown in FIGS. 10 through 15. In FIG. 10, coils 152 with an interior elastomer 154 are shown with the coils 152 having an elliptical shape and the elastomer 154 having a circular shaped void 156 therethrough. FIG. 11 shows elliptically shaped coils 156 having an elastomer 158 with an offset, or generally rectangular, hollowed cross-sectional opening 160 therethrough, while FIG. 12 shows an elliptically shaped coil 162 having an elastomer 164 with an irregularly shaped opening 166 comprising to generally circular cross-sectional areas 168, 168'.

Figure 13:
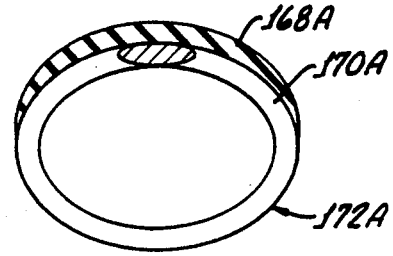
FIGS. 10–13 show various inner cross-sectional configurations in accordance with the present invention.

As hereinabove mentioned, the elastic material may be disposed within the coils 152, 156, 162, as shown in FIGS. 10, 11 and 12, or alternatively as shown in FIG. 13, an elastomer 168A may be disposed on one side 170A of coils 172A. This embodiment is most useful in applications in which a greater distribution of the load is desirable on the one side 170A of the coils 172A.

Figure 14:
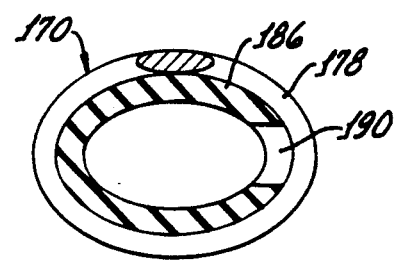
FIGS. 14–16 show variations in encapsulation of the coils of the present invention with an elastomer.
Figure 15:
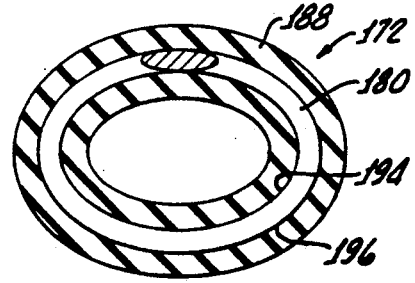
Figure 16:
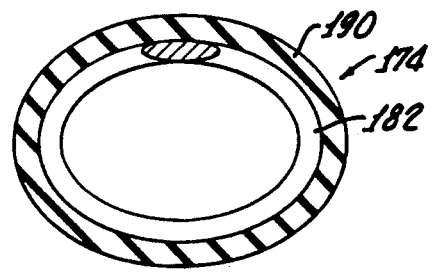

Other embodiments 170, 172, 174 of the present invention, shown respectively in FIGS. 14 through 16, said embodiments 171, 172, 174 including coils 178, 180, 182 and elastomers 186, 188, 190. The embodiment 170 includes an open area 190 through the coils 178 in order to facilitate the passage of fluid (not shown) for pressure variation, cooling or lubrication purposes.

As can be seen from FIG. 15, the elastomer 188 may be disposed as a coating both on the inside 194 and outside 196 of the coil 180, while FIG. 16 shows the elastomer 190 disposed along the outside and through the coils 182. All of these embodiments differently affect the force-deflection characteristics of the embodiments 171, 172, 174 depending upon the application of the embodiments 171, 172, 174.

The ability to maintain a relatively constant force within a certain deflection is affected by a number of parameters, all of which are taken into consideration, which include the cross-section of the elastomer and the disposition thereon as indicated in FIGS. 10 through 16; the thickness of the elastomer; the flexibility of the elastomer; the degree of bonding between the springs 152, 154, 170, 186, 188, 190 and corresponding elastomers 154, 156, 168, 186, 188, 190; the spacing between the coils 152, 154, 170, 178, 180, 182; the wire diameter; coil height; and coil width, among other considerations.

It is to be appreciated that when a canted-coil spring is filled with an elastomer, especially in an outer portion of the coil, the force applied thereon is transmitted more uniformly and the stress acting on the mating parts is substantially lower. In applications where the canted-coil spring assembly 10 is used in connection with the sealing device, it provides substantially better sealing ability and results in a substantial increase in the seal performance and seal life.

The ability of the hollowed canted-coil spring filled with an elastomer having a hollow center to achieve a high degree of deflection and maintain a relatively constant load within a high deflection decreases the total amount of force that is needed to affect sealing and this offers a significant advantage, especially in dynamic situations. The ability of the hollowed elastomer-filled spring to stretch facilitates its assembly in a single groove construction, similar to that found in O-ring applications for both mounting the assembly 10 in a piston (not shown) or in a housing (not shown).

Another very important feature of the elastomer-filled spring 14 with hollow cross-section 20 is its use as a seal itself. Heretofore, elastomers have used the canted-coil spring as a loading means in order to maintain intimate contact between the sealing surfaces of the elastomer. In many prior art applications, the elastomer tends to age or relax due to aging stiffness of the elastomer, or due to temperature cycling, and the spring is used to force the elastomer in contact with the sealing surfaces. In the present invention, by combining the elastomer 18 within the spring 14 and providing a hollow cross-section 20, both items can be accomplished in one, with a higher degree of reliability and sealing ability, and this can be done in reciprocating, rotating, oscillating, and static applications.

Another important feature is to use the spring assembly 10 as a loading means to provide more uniform loading on a sealing surface (not shown) which results in substantially better performance because it enables the use of a smaller wire thus uniformly distributing the load which results in more effective sealing ability and longer seal life.

In all of these applications, the elastomer 18 may be any type of elastomeric material such as silicone, Buna N, nitrile, fluorosilicones, PTFE, elastomers, etc. Also, certain types of plastics that have the properties of elastomers can be used due to their high coefficient of friction, their operating temperature, etc.

Figure 17:
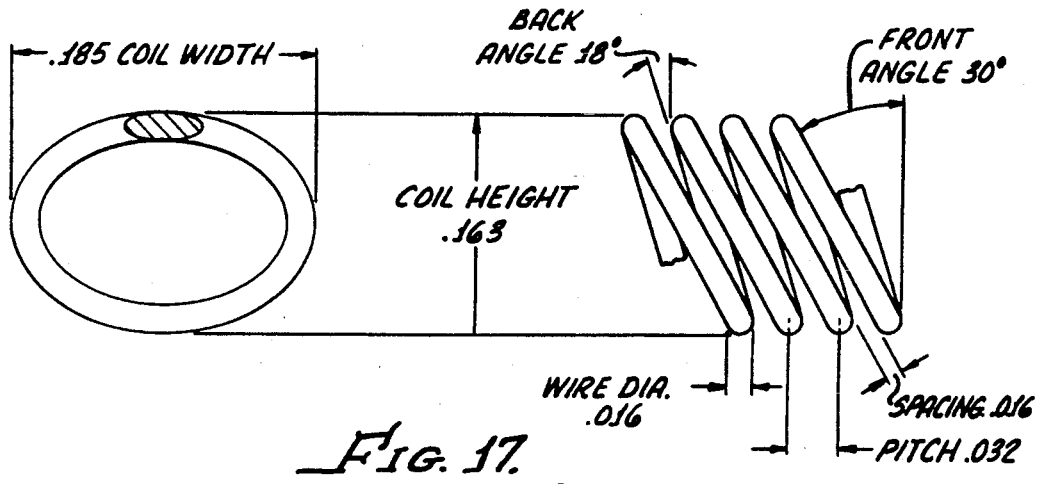
FIG. 17 is a spring, in accordance with the present invention, with a plurality of coils showing specific dimensions thereof.
Figure 18:
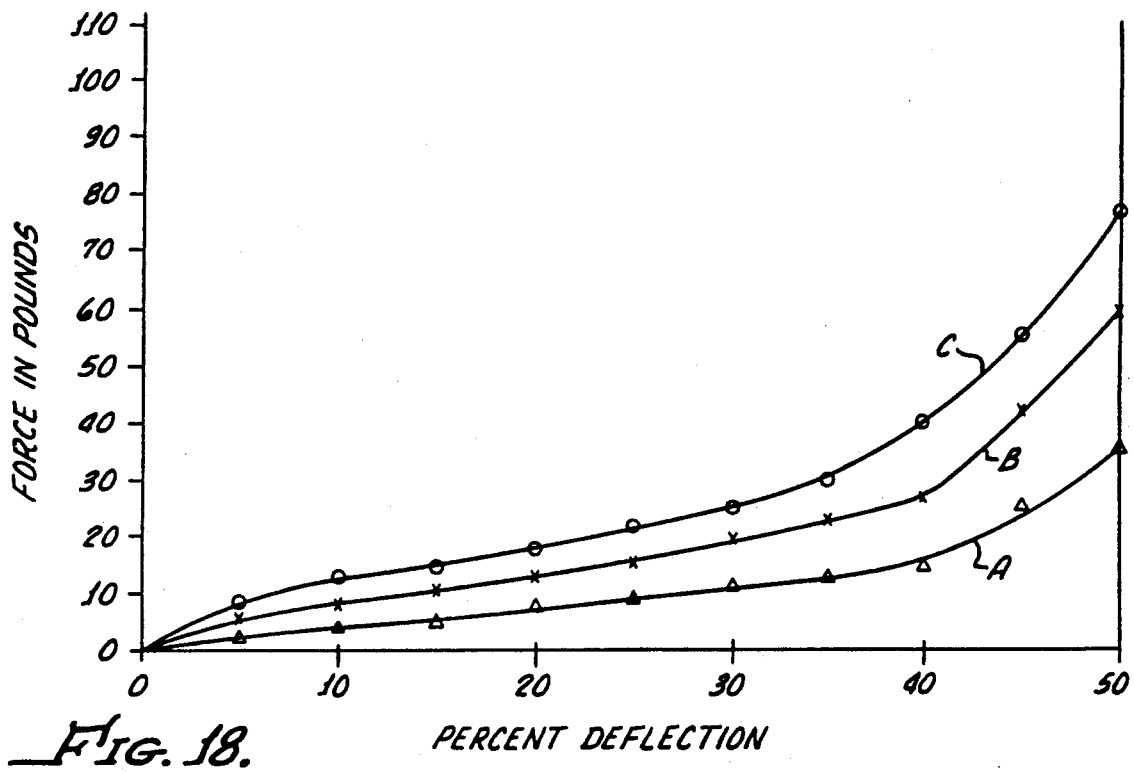
FIG. 18 is curves showing the effect of hollowed elastic material on the force-deflection curve of a canted-coil spring.

A specific example of the force-deflection characteristics for the spring 14 with coils 12, as set forth in FIG. 17, is shown in FIG. 18 as curve A. When an elastomer, such as Dow Corning Silastic 732 RTV, was filled between the coils 12 and interior thereof to a thickness of 0.016 inch with a cross-section as shown in FIG. 10, the resulting force-deflection curve obtained is illustrated as curve B in FIG. 18. The same elastomer was disposed between the coils 12 and within the coils 12 to a thickness of 0.026 inch with a cross-section shown FIG. 12. The resulting force-deflection curve is shown as curve C in FIG. 18.

As shown by the curves A, B and C of FIG. 18, the force-deflection curve of the spring assemblies 152, 160 remains relatively constant but greater than the spring 12 without elastomer shown by curve A. As the amount of elastomer is increased, or as a cross-section is varied by adding elastomer on the outside diameter or inside diameter of the coil, the force developed increases.

As illustrated in FIGS. 17a-e, the amount of elastomer 192 and placement thereof on and about a spring 194 may be varied in order to vary the spring 194 elastomer 192 performance. FIG. 17a shows a thickness of elastomer 192 being disposed without penetration between coils 196 of the spring 194 while FIGS. 17b, c and e show various amount of elastomer 192 disposed between coils 196. FIG. 17d shows a variation in elastomer 192 thickness and positions between coils 196.

Figures 19A, 19B, 19C:
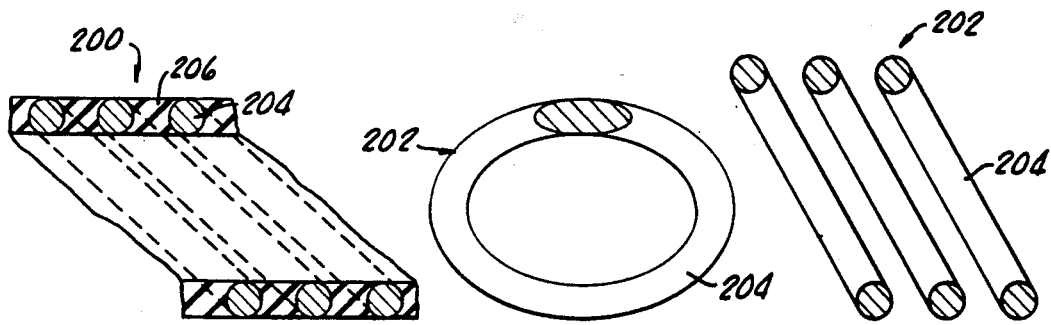
FIGS. 19a–c show in cross-sectional manner a spring disposed within an elastomer in a preloaded condition.
Figure 20:
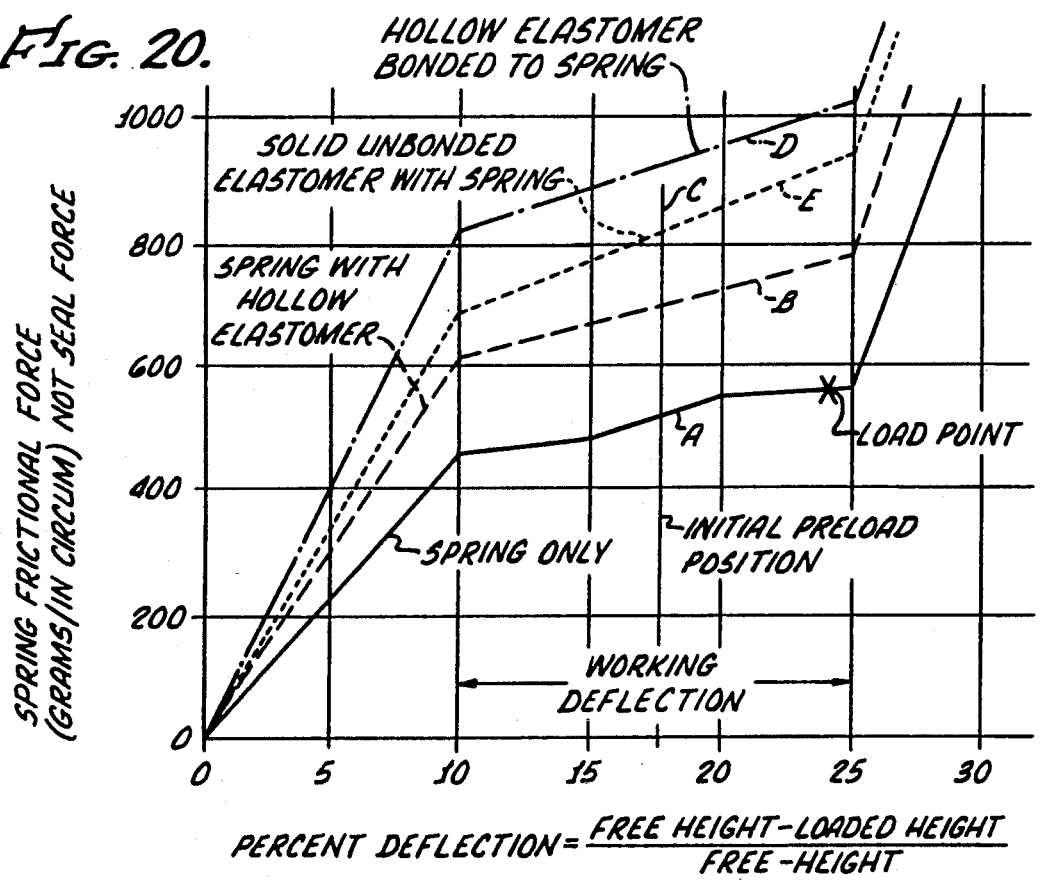
FIG. 20 shows the effect on the force-deflection curve of a spring held in a preloaded condition by the elastomer.

Turning now to FIG. 19a, there is shown a spring assembly 200 in accordance with the present invention in which the spring 202 (shown also in FIGS. 19b and c) includes a plurality of coils 204 which are preloaded before being imbedded in an elastomer 206. This further enables the tailoring of the force-deflection curve of the spring assembly 200. Curve A in FIG. 20 shows the force-deflection curve for the spring 202 only while curve B shows the load-deflection curve for the preloaded spring and elastomer. It should be appreciated that while the deflection of the spring is limited, a higher load is produced and, furthermore, with a 17.5 percent deflection in preloading shown as point C in FIG. 20.

Figures 21A, 21B, 21C:
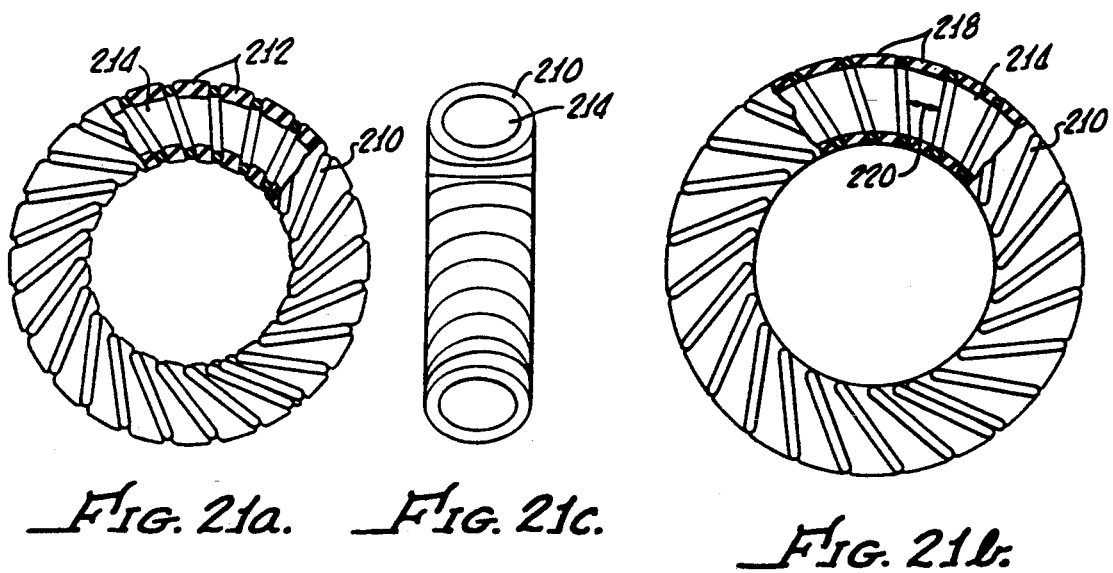
FIGS. 21a–c show a spring in a free position and imbedded in an elastomer in a stretched configuration.

FIG. 21a shows a radial spring 210 filled with an elastomer material 212 having a hollow center 214.

In this case, the spring is in a free position when filled with material. It should be contrasted with the FIG. 21b in which the spring 210 is stretched, with greater spaces as indicated by the arrow 220 between the coils 210 when filled with the elastomer material 218, the latter having a hollow core 214 as shown in FIG. 21c. The force developed by the spring 210 depends on the amount of stretch with the mechanical of the elastomer, degree of bonding, spacing between the coils, ratio of the coil height to coil width, etc. A spring of this type may be used in order to provide an extension load or can be used to provide a combination of extension load and compression load. In either case, stretching of the coils can be used to further modify the force-deflection curve of the spring 210.

In the manufacture of the spring assembly 10, the spring 14 may be made longer than necessary to complete a circle within a groove 250 as shown in FIG. 22, the groove 250 being in a piston or housing, not shown. In this instance, the excessive spring length will cause the elastomer 18 to butt and therefore eliminate any gap between the spring ends.

Turning now to FIGS. 23a and b, there is an alternate embodiment: of the spring assembly 300 which includes a first plurality of coils 302 interconnected with another in a spaced-apart relationship for causing the spring assembly 300 to exert a generally constant force in a loading direction normal to a tangent to a center line 304. As hereinbefore described in connection with the plurality of coils 12, an elastic material 306 is disposed around and between the plurality of coils 302, a hollow cross-section 308 which provides means for modifying the force exerted by the spring 302 assembly 300 in response to deflection of the spring assembly 300 along a loading direction as hereinbefore described.

Disposed within the plurality of coils 302 is a second plurality of coils 310 interconnected with one another in a spaced-apart relationship and disposed in a cooperating relationship inside the first plurality of coils for causing the spring assembly 300 to exert a generally constant force in a loading direction approximately normal to the center line 304.

An elastic material 312 disposed around and between the plurality of coils 310 and including a hollow cross-section 314. FIG. 23b shows a cross-sectional view of the spring assembly 300 and also shows that the elastic materials 306, 312 may be separate from one another with a gap 320 therebetween to allow relative movement therebetween as the spring assembly 300 is loaded.

Similar to the spring assembly 300, a spring assembly 330 shown in FIGS. 24a and b include a first plurality of coils 332 with an elastic material 334 disposed therearound and a second plurality of coils 336 within the elastic material 338 therearound. The configuration of the first and second pluralities of coils 332, 336 and elastic material 334, 338 is similar to the coil assembly 300 shown in FIGS. 23a and b except that the first plurality of coils 332 is canted in an opposite direction from the second plurality of coils 336 along a center line 342. The performance of the embodiments shown in FIGS. 23a and b and 24a and b are similar to that hereinbefore described in connection with the spring assembly 10 further extending the design range capability of the forced deflection curves thereof.

Turning now to FIGS. 25-27, there are shown alternative embodiments 350, 352 of the present invention which include a plurality of coils 354, 356 within the elastic material 358, 360 thereabout. The feature of the embodiments of 350, 352 is the shape of the elastic 358, 360 which includes depending portions 364, 366 and 368, respectively, which provide a means for positioning the plurality of coils 354, 356 in order that the loading direction is approximately perpendicular to the center line 370, 372, respectively.

Figure 28:
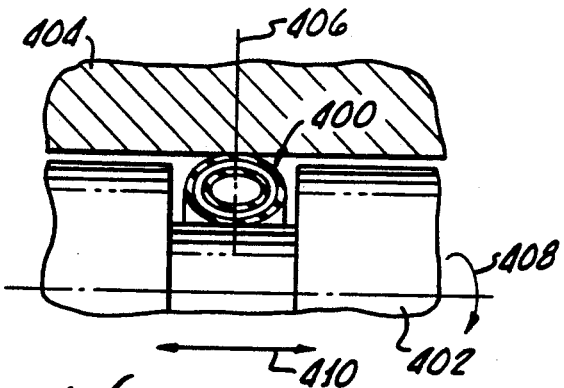
FIGS. 28 and 29 show dynamic sealing applications for the apparatus of the present invention in which the seal is mounted in a piston and in a housing, respectively.

Turning now to FIG. 28, there is shown a spring assembly 400 mounted in a piston 402, providing a seal against a housing 404 under low pressure dynamic service. The spring assembly 400 is loaded along a minor axis 406 and provides a seal between the piston 402 and the housing 404, both in a rotary motion as indicated by the arrow 408 or reciprocating motion as indicated by the arrow 410.

Figure 29:
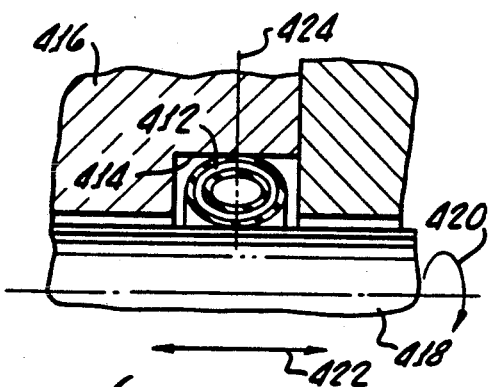

FIG. 29 shows a similar arrangement for dynamic service in which the spring 412 is disposed within a groove 414 in a housing 416, providing a seal against a piston 418 which may rotate as indicated by the arrow 420 or reciprocate as indicated by the arrow 422. This spring 412 is also loaded along the minor axis 424 thereof.

Figure 30:
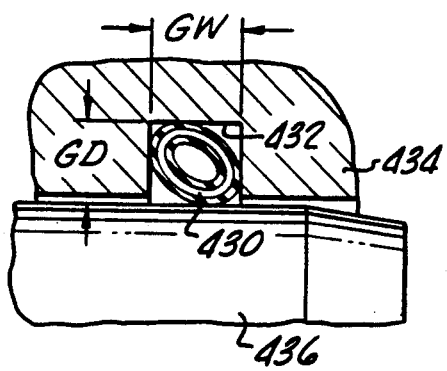
FIGS. 30 and 31 show respectively a spring mounted in a housing and piston and retained in a groove with a groove width larger than the coil height and a groove depth smaller than the coil width.

FIG. 30 shows a spring assembly 430 with a turn angle $\theta$ (see FIG. 7a) disposed in a groove 432 in a housing 434 in which the spring assembly 430 is retained in the groove 432 in an axial loaded position and loaded radially by piston 436 to provide static or dynamic sealing. In this instance, the groove width, GW, is larger than the coil height, CH (see FIG. 7a), while the groove depth, GD, is smaller than the coil width, CW. Hence, the spring assembly 430 assumes a turn angle $\theta$ (see FIG. 7a).

Figure 31:
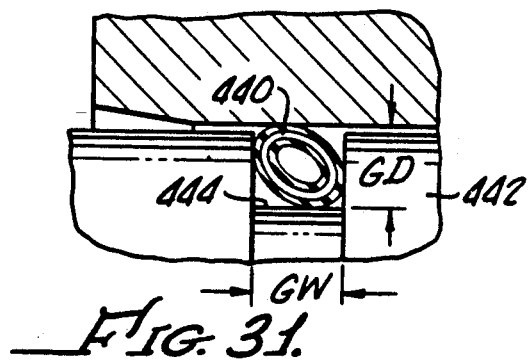

Similarly, FIG. 31 shows a spring assembly 440 with a turn angle $\theta$ (see FIG. 7a) mounted in a piston 442 groove 444 with the spring being loaded axially within groove 444 and radially by housing 434a. In this instance also, the groove width GW is larger than the coil height, CH (see FIG. 7a), while groove depth GD is smaller than the coil width CW. The spring assembly 440 assumes a turn angle $\theta$ (see FIG. 7a). It should also be appreciated that the spring 440 may also be made with a very small inside diameter so that upon assembly, it stretches into the piston groove 444, providing additional retaining force which provides an additional advantage in rotating applications. In another instance, the seal may be mounted on the housing or piston as in FIGS. 30 and 31 (not shown but having a groove width GW smaller than the coil width and a groove depth smaller than the coil height).

Figure 32A:
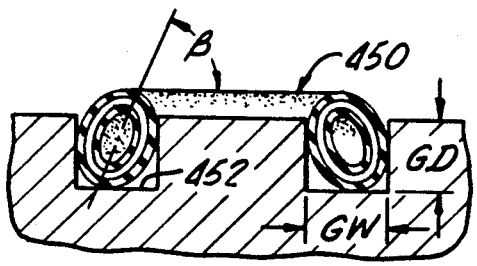
FIGS. 32a and 32b show a seal within the cavity for static or dynamic service in which the seal is retained in the cavity by compressing the seal along the minor axis, FIG. 32a showing the spring in an assembled position and 32b showing the spring in a loaded position.

FIG. 32a shows a spring assembly 450 with a turn angle $\theta$ (see FIG. 7a) disposed in a groove 452 in which the groove width, GW, is slightly larger than the coil height, CH, and the groove depth, GD, is slightly smaller than the coil width, CW.

Figure 32B:
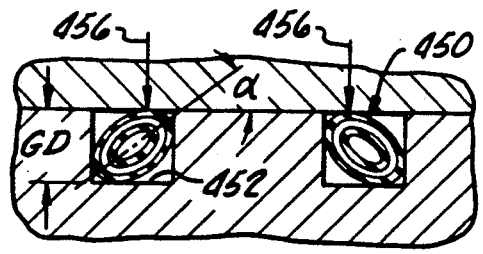

As shown in FIG. 32a, when the seal 450 is assembled into the groove 452, it assumes an assembly turn angle $\beta$ which is preferably less than 70°. It has been found that the smaller the assembly turn angle $\beta$, the easier it becomes to deflect the seal 450. The seal 450 is shown in a loaded position in FIG. 32b in which it assumes the load turn angle $\alpha$. Shown in FIG. 32b is a flange causing a loading of the seal 450 as indicated by the arrows 456.

Figure 33A:
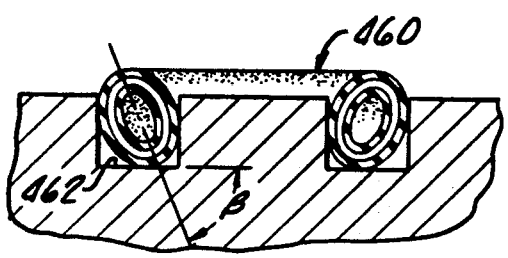
FIGS. 33a and 33b are similar to that of FIGS. 32a and 32b, with the spring being disposed in an inverted position compared to FIGS. 32a and 32b.

In FIGS. 33a and b, there is shown a seal 460 in a groove 462, corresponding to the spring 450 shown in FIGS. 31a and b, except the seal 460 is inverted.

Figure 34:
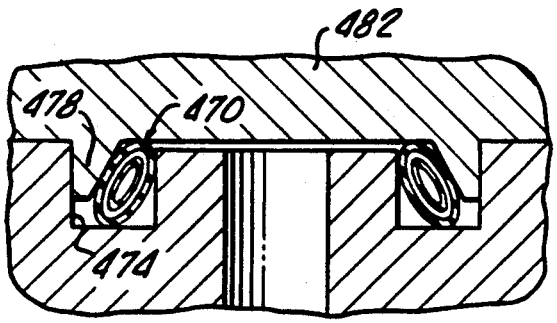
FIGS. 34–40 show various applications of spring seals in accordance with the present invention.
Figure 35:
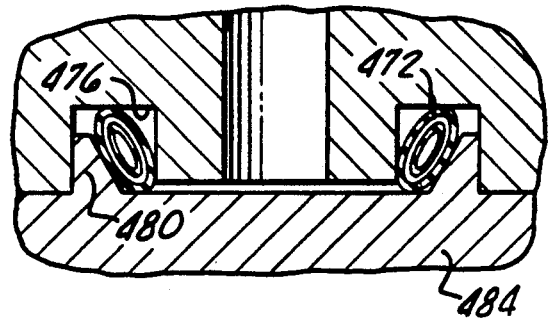

A static application for seals 470, 472 is shown in FIGS. 34 and 35, in which the seals 470, 472 are found in rectangular grooves 474, 476, respectively, and loaded with tapered portions 478, 480, the latter being part of flanges 482, 484, respectively. As shown in FIGS. 34 and 35, the seal 472 is inverted with respect to the seal 470, and the tapered pushers 478, 480 cause the seal 470, 472 to deflect and turn at the same time. As shown, the seal is loaded from the outside causing the coils thereof to butt from the inside towards the outside.

Figure 33B:
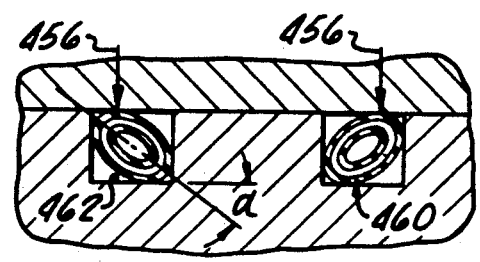
Figure 36:
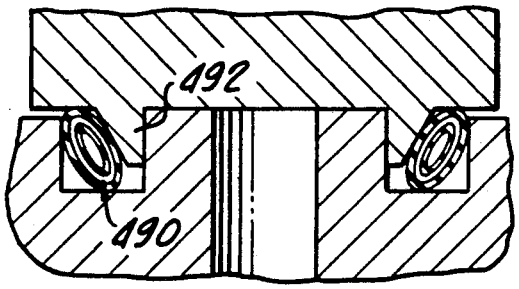

FIG. 36 shows a seal 490 which is a variation of the seals 470, 472 shown in FIGS. 33 and 34, except that the coils thereof are loaded with a tapered pusher 492 from an inside diameter which causes the outside coils to deflect.

Figure 37:
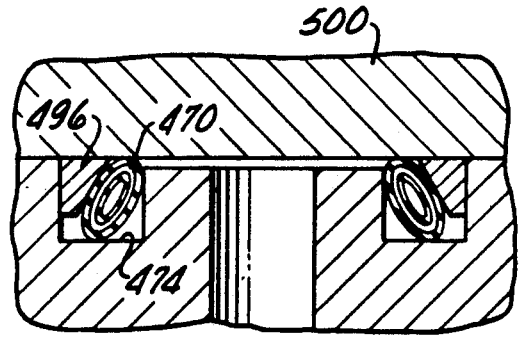
Figure 38:
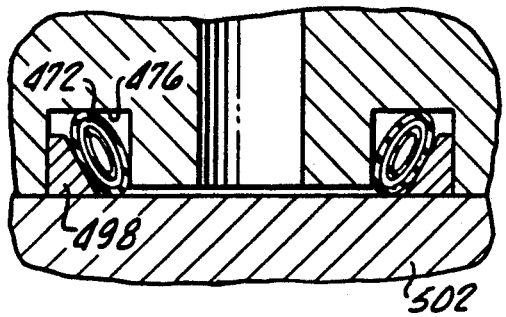
Figure 39:
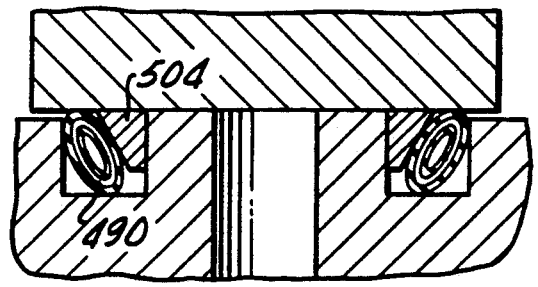

FIGS. 37 and 38 show the seals 470, 472 in grooves 474, 476, as shown in FIGS. 34 and 35, except that separate pushers 496, 498 are utilized, which are not part of the flanges 500, 502. Similarly, FIG. 39 shows the seal 490 with a separate pusher 504.

Figure 40:
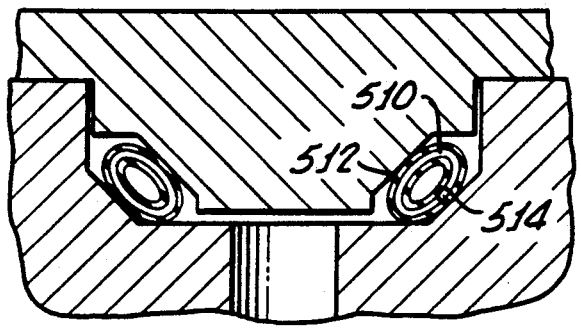

Turning now to FIG. 40, there is shown a seal 510 disposed for static service between two opposing surfaces 512, 514, designed for low pressure service, the latter service causing the seal 510 to assume an inverted position.

Figure 41:
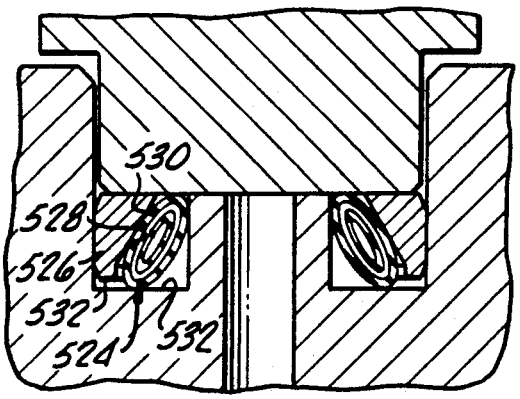
FIG. 41 shows an embodiment of the present invention utilizing a separate tapered pusher for loading the spring seals.

Shown in FIG. 41 is an alternative embodiment of the present invention including a seal 524 which incorporates a tapered pusher 526 having a compound surface 528 with two portions 530, 532 in order to further control the loading of the seal 524 within a groove 532.

Figure 42:
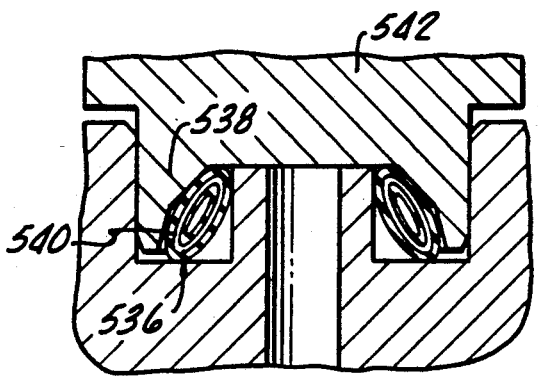
FIG. 42 is similar to the seal shown in FIG. 40 utilizing a double angle pusher.

A modification of the seal 524 is shown in FIG. 42 in which the seal 536 is loaded by a pusher 538, a compound surface 540 is an integral part of the flange 542. The pusher 538 gradually loads the seal 536 on the outside and provides a higher degree of deflection of the coils by causing the coils to deflect on the outside diameter.

Figure 43:
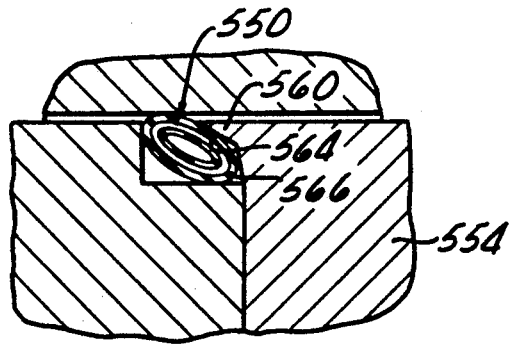
FIGS. 43–44 show various piston and housing mounted with the spring seals in accordance with the present invention utilizing pushers.
Figure 44:
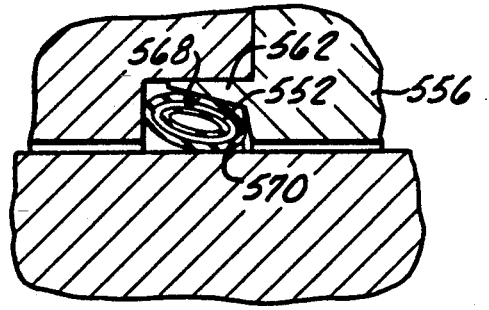

FIGS. 43 and 44 show seals 550, 552, respectively, found in a split piston 554 or split housing 556. In addition pushers 560, 562 have angled surfaces 564, 566, 568 and 570 in order to load the seals 550 and 552 as hereinbefore referenced.

Although there has been hereinabove described a specific arrangement of a spring-loaded ring and seal assembly, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A canted-coil spring-loaded ring seal assembly comprising:
   a plurality of elliptical coils having a major and a minor axis and canted along a center line defined by an intersection of a major and minor axes;
   elastic material means for modifying the force exerted by the spring assembly in response to deflection of the spring assembly along a loading direction and for providing a sealing surface, said elastic material means being disposed around and within said plurality of coils and having a void therein disposed within said plurality of coils, said void having a maximum dimension substantially smaller than a coil diameter measured along the minor axis; and
   groove means for noninvasively supporting the plurality of coils and elastic material in an orientation for controlling the resilient characteristics of the plurality of coils and for orienting said sealing surface for sealing contact with a loading member.

2. The canted-coil spring assembly according to claim 1 wherein said coils are interconnected in a manner forming a garter-type resilient canted-coil spring and said groove means comprising a cavity for deflecting the spring along the coil minor axis and enabling said garter-type resilient coil spring to be loaded along the coil major axis.

3. The canted-coil spring assembly according to claim 2 wherein said cavity is sized and configured for supporting and orienting said garter-type resilient coiled spring with a turn angle of greater than 0° and less than 90°.

4. The spring assembly according to claim 1 wherein said plurality of coils is disposed within said elastic material means in a stretched spaced-apart relationship, the elastic material means having sufficient resistance to hold the plurality of coils in said stretched spaced-apart relationship, the spacing between coils in said stretched spaced-apart relationship being greater than the spacing between coils when not held in a stretched-apart relationship by the elastic material means.

5. The spring assembly according to claim 1 wherein said plurality of coils is disposed within said elastic material means in a preloaded condition in which the plurality of coils are deflected along the loading direction.

6. The spring assembly according to claim 1 further comprising means, defining an open passage through the elastic material and between adjacent coils, for enabling passage of fluid into the void.

7. The spring assembly according to claim 1 wherein, said void has a circular cross-section.

8. The spring assembly according to claim 1 wherein said elastic material means includes a plurality of voids within the elastic material means and inside of said plurality of coils.

9. The canted-coil spring assembly according to claim 1 wherein said void has a generally rectilinear cross-section.

10. A spring-loaded ring seal assembly comprising:
    a plurality of coil means, interconnected with one another in a spaced-apart relationship, for causing the spring assembly to exert a generally constant force in a loading direction approximately normal to a tangent to a center line of said plurality of coil means in response to deflection of the spring assembly along said loading direction;
    elastic material means for modifying the magnitude of the generally constant force exerted by the plurality of coils in response to deflection of the spring assembly along said loading direction and for providing a sealing surface, said elastic material means being disposed around and within said plurality of coils and having a void therein disposed within said plurality of coils, said void having a maximum dimension substantially smaller than a coil diameter measured along the minor axis; and
    groove means for noninvasively supporting the plurality of coil means and elastic material means in an orientation for controlling the resilient characteristics of the plurality of coil means and for orienting said sealing surface for sealing contact with a loading member.

11. The canted-coil spring assembly according to claim 10 wherein said plurality of coil means are interconnected in a manner forming a garter-type resilient canted-coil spring and said groove means comprises a cavity for deflecting the spring along the coil minor axis and enabling said garter-type resilient coil spring to be loaded along the coil major axis.

12. The canted-coil spring assembly according to claim 11 wherein said cavity is sized and configured for supporting and orienting said garter-type resilient coiled spring with a turn angle of greater than 0° and less than 90°.

13. The spring assembly according to claim 10 wherein said plurality of coil means is disposed within said elastic material means in a stretched spaced-apart relationship, the elastic material means having sufficient resistance to hold the plurality of coil means in said stretched spaced-apart relationship, the spacing between coils in said stretched spaced-apart relationship being greater than the spacing between coil means when not held in a stretched-apart relationship by the elastic material means.

14. The spring assembly according to claim 10 wherein said plurality of coil means is disposed within said elastic material means in a preloaded condition in which the plurality of coils is deflected along the loading direction.

15. The spring assembly according to claim 10 further comprising means, defining an open passage through the elastic material and between adjacent coils, for enabling passage of fluid into the void.

16. The spring assembly according to claim 10 wherein said void has a circular cross-section.

17. The spring assembly according to claim 10 wherein said elastic material means includes a plurality of voids within the elastic material means and inside of said plurality of coil means.

18. The spring assembly according to claim 10 wherein said void has a generally rectilinear cross-section.

* * * * *